US012086384B2

(12) United States Patent
Morgan et al.

(10) Patent No.: US 12,086,384 B2
(45) Date of Patent: Sep. 10, 2024

(54) MULTIMODAL DECISION SUPPORT SYSTEM USING AUGMENTED REALITY

(71) Applicants: Gwendolyn Morgan, Brewerton, NY (US); Martha Grabowski, Cazenovia, NY (US); Jean-Philippe Rancy, Queens Village, NY (US)

(72) Inventors: Gwendolyn Morgan, Brewerton, NY (US); Martha Grabowski, Cazenovia, NY (US); Jean-Philippe Rancy, Queens Village, NY (US)

(73) Assignee: Martha Grabowski, Cazenovia, NY (US)

( * ) Notice: Subject to any disclaimer, the term of this patent is extended or adjusted under 35 U.S.C. 154(b) by 80 days.

(21) Appl. No.: 18/051,161

(22) Filed: Oct. 31, 2022

(65) Prior Publication Data

US 2024/0143128 A1 May 2, 2024

(51) Int. Cl.

| | |
|---|---|
| ***G06F 3/0482*** | (2013.01) |
| ***B64U 10/00*** | (2023.01) |
| ***G05D 1/00*** | (2024.01) |
| ***G06T 19/00*** | (2011.01) |

(52) U.S. Cl.

CPC ........... *G06F 3/0482* (2013.01); *B64U 10/00* (2023.01); *G05D 1/0016* (2013.01); *G06T 19/006* (2013.01); *B64U 2201/20* (2023.01)

(58) Field of Classification Search

CPC ... G06F 3/0482; G05D 1/0016; G06T 19/006; B64U 10/00; B64U 2201/20

See application file for complete search history.

(56) References Cited

U.S. PATENT DOCUMENTS

| | | | | |
|---|---|---|---|---|
| 9,316,830 | B1 * | 4/2016 | Costa | G02B 27/017 |
| 9,471,690 | B2 | 8/2016 | Ali et al. | |
| 10,231,614 | B2 | 3/2019 | Krueger | |
| 11,244,164 | B2 | 2/2022 | Gurajapu et al. | |
| 2006/0022845 | A1 * | 2/2006 | Fischer | G08G 5/045 340/945 |
| 2012/0299950 | A1 * | 11/2012 | Ali | G06T 19/006 345/592 |
| 2015/0109191 | A1 * | 4/2015 | Johnson | G02B 27/017 345/156 |
| 2015/0358201 | A1 * | 12/2015 | Park | H04M 19/04 715/735 |
| 2016/0263477 | A1 * | 9/2016 | Ladd | A63F 13/212 |
| 2018/0292213 | A1 * | 10/2018 | Grabowski | G05D 1/0206 |

(Continued)

*Primary Examiner* — Hong Zhou

(74) *Attorney, Agent, or Firm* — Hoffman Warnick LLC

(57) ABSTRACT

An augmented reality (AR) system and method that provides multimodal decision support for users engaged in safety critical missions. A system includes a wearable device having a first lens configured for a first eye of a user and a second lens configured for a second eye of the user; and a computing platform integrated into the wearable device that includes: a communication manager configured to receive and process communication feeds from a plurality of data sources; and a display manager configured to display image-based data on the first lens and text-based data on the second lens, wherein the image-based data includes a set of user-selectable views and the text-based data includes a set of user-selectable pages, and wherein only one of the image-based data or text-based data is displayable for the user at a time.

20 Claims, 10 Drawing Sheets

(56) References Cited

U.S. PATENT DOCUMENTS

| | | | | |
|---|---|---|---|---|
| 2019/0096135 | A1* | 3/2019 | Dal Mutto | G06F 18/24765 |
| 2021/0110721 | A1* | 4/2021 | Grabowski | G06T 11/60 |
| 2021/0216773 | A1* | 7/2021 | Bohannon | G06V 20/20 |
| 2021/0306599 | A1* | 9/2021 | Pierce | A61B 90/35 |
| 2021/0321028 | A1 | 10/2021 | Stoner | |
| 2022/0019293 | A1 | 1/2022 | Komaki et al. | |

* cited by examiner

Figure 7
Search Sync
Sync with UAS
Phone Hotspot
AIS
Next
Search Environment
Next

MULTIMODAL DECISION SUPPORT SYSTEM USING AUGMENTED REALITY

BACKGROUND OF THE DISCLOSURE

Decision support for users engaged in safety-critical operations such as Arctic search and rescue (SAR), oil spill responses, etc., requires obtaining and processing real-time information from a variety of modes or channels. Such multimodal decision support systems may for example receive information from system and sensor monitoring; mission, operation, target and survivor status; search and rescue planning and coordination; etc. Operators in such settings must make crucial decisions in real-time, utilizing relevant information to monitor, assess and respond to critical incidents.

BRIEF DESCRIPTION OF THE DISCLOSURE

Aspects of this disclosure provide an augmented reality (AR) based system and method that collects, processes, and separately displays image-based data and text-based data on a pair of lenses for users engaged in safety-critical operations.

A first aspect of the disclosure provides an AR system that provides multimodal decision support for users engaged in safety critical missions, comprising: a wearable device having a first lens configured for a first eye of a user and a second lens configured for a second eye of the user; and a computing platform integrated into the wearable device that includes: a communication manager configured to receive and process communication feeds from a plurality of data sources; and a display manager configured to display image-based data on the first lens and text-based data on the second lens, wherein the image-based data includes a set of user-selectable views and the text-based data includes a set of user-selectable pages, and wherein only one of the image-based data or text-based data is displayable for the user at a time.

A second aspect of the disclosure provides an AR system that provides multimodal decision support for users engaged in safety critical missions, comprising: a wearable device having a first lens configured for a first eye of a user and a second lens configured for a second eye of the user; and a computing platform integrated into the wearable device that includes: a communication manager configured to receive and process communication feeds from a plurality of data sources; and a display manager configured to display image-based data on the first lens and text-based data on the second lens, wherein the image-based data includes a set of user-selectable views; and a mission App configured to run on a smart device, the mission App is configured to receive text-based data from a plurality of sources and relay the text-based data to the computing platform via the smart device.

A third aspect of the disclosure provides a method for utilizing augmented reality (AR) to provide multimodal decision support for users engaged in safety critical missions, comprising receiving configuration parameters at a wearable device having a first lens configured for a first eye of a user and a second lens configured for a second eye of the user, wherein the configuration parameters are determined via a configuration App by a user establishing a mission criteria; receiving data feeds at the wearable device from a plurality of data sources; and configuring display options of the data feeds based on the configuration parameters, wherein the display options include displaying image-based data on the first lens and text-based data on the second lens, wherein the image-based data includes a set of user-selectable views and the text-based data includes a set of user-selectable pages, and wherein only one of the image-based data or text-based data is displayable for the user at a time.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
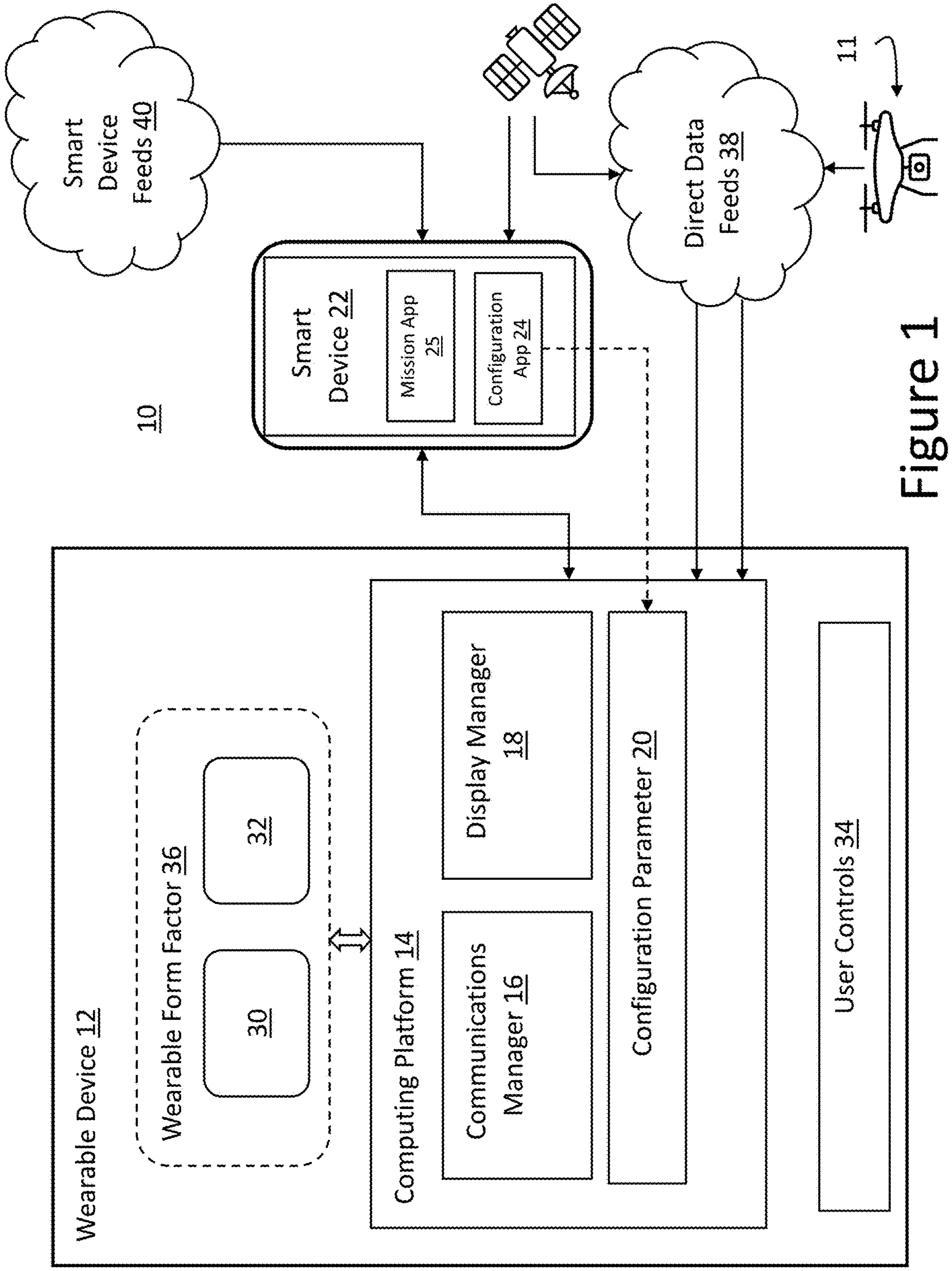
FIG. 1 depicts an illustrative augmented reality (AR) system, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure include technical solutions that provide real-time visual decision support information to users engaged in safety-critical missions, such as search and rescue, oil spill response, intelligence gathering, etc. Users in such settings must make crucial decisions in real-time, utilizing relevant multimodal information to monitor, assess and respond to critical incidents. Embodiments described herein provide an augmented reality (AR) system that leverages human distributed cognition capabilities to display information from visual, audio, haptic and experiential channels to the user via a wearable device. In certain aspects, visual information is split between two lenses of the wearable device to better support human cognitive processes and to address needs for real-time decision support in safety-critical missions.

In various approaches, an AR based system merges multimodal data from a variety of sources for users engaged in safety-critical missions. The system integrates data feeds, including real-time structured and unstructured communication, location, spatial, relational, resource, temporal and mission status information from communication networks, sensors, operational platforms and human input, including feeds from unmanned aerial vehicles and systems (UAV/UAS). The data and information are integrated and processed for display on wearable devices having form factors with two viewing areas, i.e., a left and right lens, such as smart glasses, helmets, heads up displays (HUDs), etc.

The data feeds are distributed and overlayed visually as: (1) text-based data that is displayable via a first lens and (2) image-based data that is displayable via a second lens, which has been shown in improve human cognitive processes in safety-critical environments. In a typical approach, only one of the text-based data or image-based data is displayed onto a respective lens at a time (i.e., during use, the user can select which lens to make active via a user input). Within the activated lens, the user can selectively toggle through different views of image-based data or different pages of text-based data. For example, image-based data may include a first overlay view displaying video, a second overlay view displaying graphics, a third overlay view displaying still images, etc., which the user can toggle between. Additional types of image-based data may for example include a holograph, animation, two- or three-dimensional image data, a projection, etc.

Text-based data may include mission status information, GPS data, weather data, plan data, vessel data, terrain data, etc. Given the limited area on lens, the text-based data can be organized into pages that the user can scroll between. Data can also be 'turned off' on either/both lenses if necessary. Audio and aural information can be displayed as text or as graphics, imagery and/or video messages, e.g., to notify the mission team of updates or changes. The data that is displayed across these two lenses can be customized ahead of time through a configuration application (App) that allows members of the mission team to choose the type of data that will be displayed on the lenses, e.g., based on a mission criteria, such as the type of mission and needs of the user. Splitting the data between text and image-based data provides rich multimodal data in separate human cognitive processing channels to support human brain-motor functions, which can improve operator effectiveness in safety-critical operations.

Referring to FIG. 1, an illustrative AR based system 10 is shown that includes a wearable device 12, a smart device 22 (e.g., a smart phone), and in some cases an autonomous vehicle 11 such as drone. Wearable device 12 generally includes: (1) a wearable form factor 36 (e.g., smart glasses) having a pair of lenses 30, 32 adapted to be worn over the left and right eye of a user and overlay visual information; (2) a computing platform 14 that receives data feeds and outputs visual overlays to the lenses 30, 32; and (3) a set of user controls, e.g., touch inputs, voice recognition, gesture recognition, motion sensors, eye tracking, etc., to allow the user to control aspect such as the visual overlays. It is understood that lenses 30, 32, which have the capability to reflect projected digital images while allowing the user to see through, may be implemented with any type of transparent material onto which visual information can be overlayed to provide an augment reality experience.

Computing platform 14 includes a communications manager 16 for receiving and processing different data feeds. For example, communications manager 16 may be configured to receive: direct data feeds 38, e.g., from autonomous systems (e.g., drone 11), sensor data, etc.; and smart device feeds 40 processed and relayed via apps running on the smart device 22, e.g., text messages, weather data, mission data, voice to text data, GPS data, etc. Accordingly, communications manager 16 may include different communication capabilities and protocols for synchronizing and receiving data, e.g., Wi-Fi, Bluetooth, cellular, radio, etc., from the smart device 22, from drones, satellites, etc.

In certain aspects, smart device feeds 40 are collected, processed and relayed by a mission App 25 running on smart device 22. For example, mission App 25 may receive operational data, sensor data, communication data, etc., via cellular data, SMS, Wi-Fi, etc., and prioritize, coalesce, categorize, and package the data for relay to the computing platform 14. In some instances, the data received by mission App 25 is unstructured, e.g., social media data, text data, etc., and can processed by an artificial intelligence algorithm to provide structured information. For example, a structured GPS location of an incident or survivor coordinates may be determined from unstructured posts on social media. In other cases, the data received by mission App 25 may be in a structured format, e.g., weather or sensor data. Furthermore, data feeds received by mission App 25 may be prioritized such that the more time critical information is relayed first to the computing platform. Display manager 18 determines what and how data is presented to the lenses 30, 32. For example, text-based data may be packaged in a set of pages for display on the left lens 30, while image-based data may be packaged in a set of views for display on the right lens 32. The particular arrangement and type of data to be captured and displayed may be controlled by a set of configuration parameters 20 and user controls 34. For example, the configuration parameters 20 might dictate that the image-based data includes a UAS video view, a UAS thermal imaging view, and a radar image view, through which the user can toggle via the user controls 34. The configuration parameters 20 might further dictate that a first page of text-based data include mission plan data (status, time, search area, etc.), a second page include weather and ground condition data, a third page include UAS based information such as drone location, altitude, payload, etc., through which the user can toggle via the user controls 34. The user can also select whether they want to view text-based data or image-based data via user controls 34. In certain implementations, configuration parameters 20 are determined and implemented before the mission using a configuration App 24 that runs on the smart device 22 or some other computing system. In some cases, the configuration parameters 20 can be distributed to a set of team members engaged in the mission, so each user receives the same data feeds, pages and views via their particular wearable device.

Figure 2:
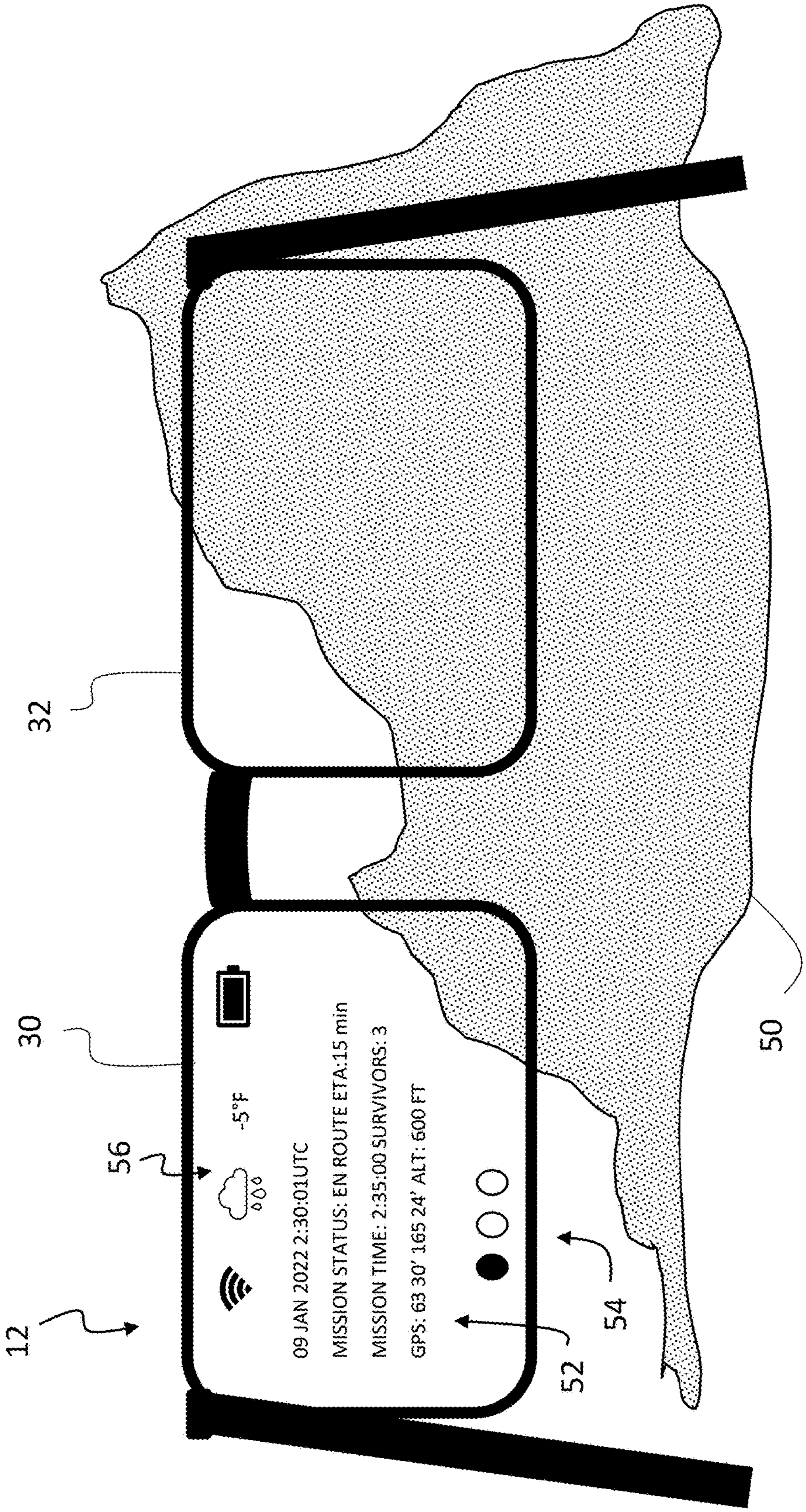
FIG. 2 depicts a wearable device in the form of smart glasses with the left lens active, in accordance with an illustrative embodiment.
Figure 3:
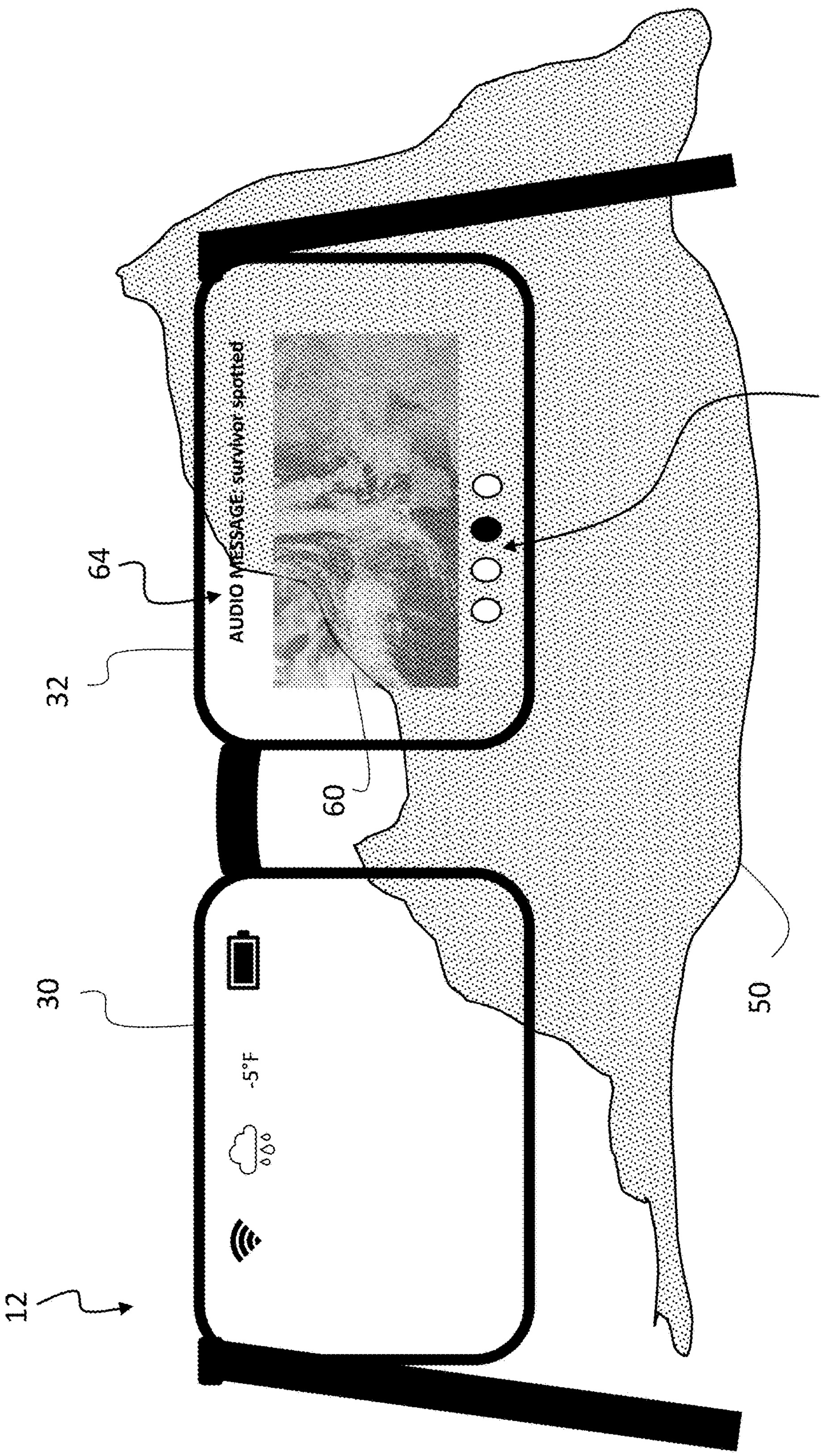
FIG. 3 depicts a wearable device in the form of smart glasses with the right lens active, in accordance with an illustrative embodiment.

FIGS. 2 and 3 depict illustrative embodiments showing AR overlays in wearable device 12 viewing a terrain feature 50 (e.g., a mountain, lake, land area, etc.). FIG. 2 depicts an example with the left lens 30 activated, i.e., lens 30 includes an overlay showing text-based data, and the right lens 32 is inactive, i.e., lens 32 includes no overlay. In this example, a first page of text 52 is shown. Two additional pages are indicated as available by indicators 54, which for example can be accessed with a swipe motion by the user. In this example, the left lens 30 also includes a set of status icons 56 indicating Wi-Fi strength, weather, temperature, and battery status.

FIG. 3 depicts an example with the right lens 32 activated, i.e., lens 32 includes an overlay showing image-based data, and the left lens 30 is inactive, i.e., lens 30 includes no overlay data except for the status icons. In this example, a view of a radar image 60 is overlayed on the lens 32, which is the third of four available views as indicated by indicators 62. The other views can be selected with, e.g., a swipe action by the user. For example, additional image-based views could include drone video, thermal imaging, LiDAR, etc.

This embodiment further includes a voice-to-text display area 64 for displaying audio messages, e.g., received from other team members.

In the described embodiments of FIGS. 2 and 3, the first lens 30 is exclusively configured for displaying text-based data and the second lens 32 is exclusively configured for displaying image-based data. Based on experiments, this AR configuration has been shown to be a highly effective approach for relaying multimodal data to a user in high stress, safety-critical environments.

Figure 4:
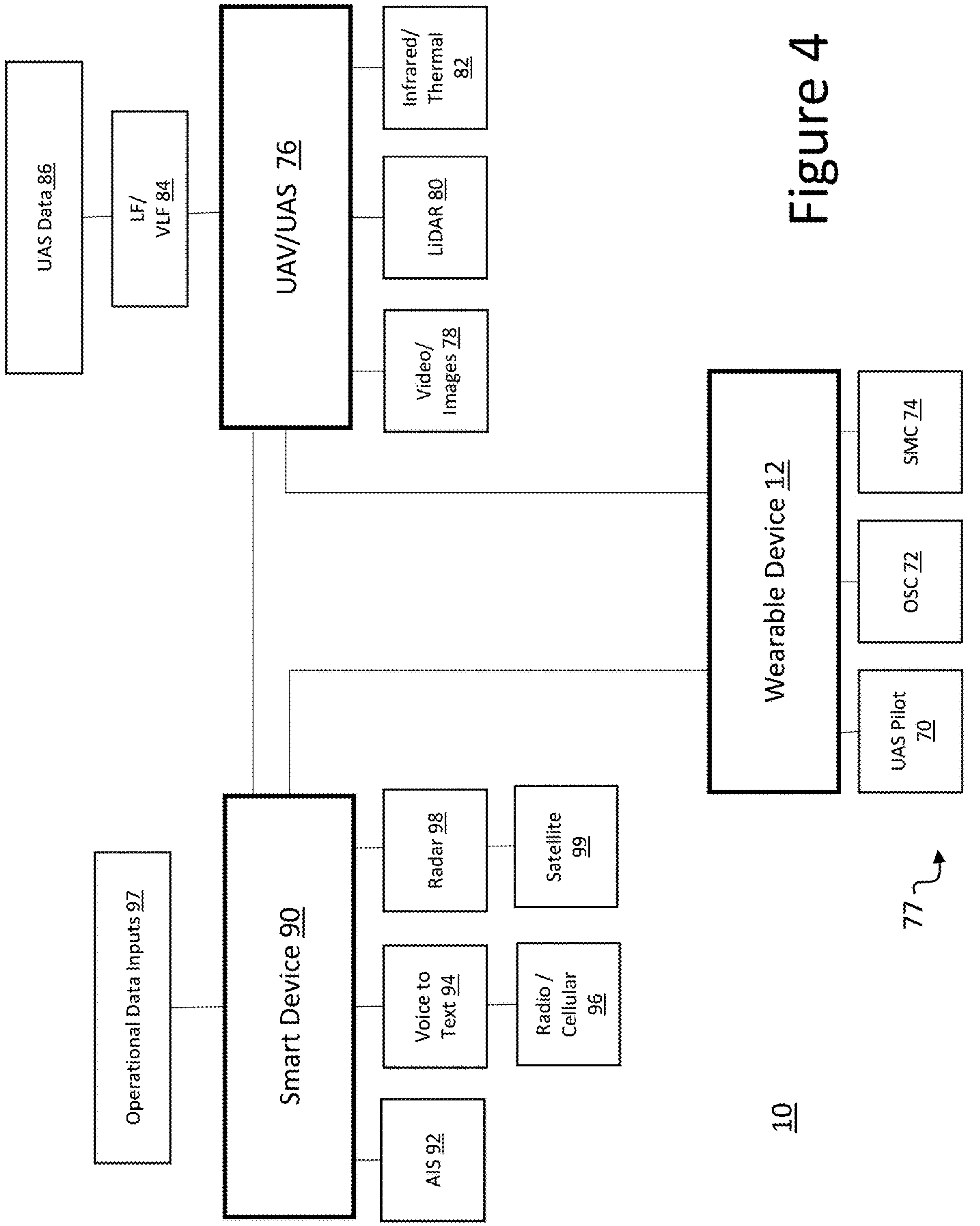
FIG. 4 depicts a set of data feeds for an AR system, in accordance with an illustrative embodiment.

FIG. 4 depicts an illustrative data flow architecture for an AR based system 10. In this example, wearable device 12 is configured to receive data from smart device 90, unmanned aerial vehicles/unmanned aerial systems (UAV/UAS) 76, and other direct communication feeds 77. As shown, UAV/UAS 76 feeds may flow directly to wearable device 12, or indirectly via smart device 90. UAV/UAS 76 feeds may for example include real-time video and still imagery 78, LiDAR 80, infrared and thermal imaging 82. UAV/UAS 76 may also include feeds of UAS data 86 via low frequency (LF) or very low frequency (VLF) 84 channels (UAS generally refers to the totality of everything that makes a UAV work, including its GPS module, ground control module, transmission systems, camera, all the software, and the person on the ground controlling the drone). Accordingly, UAS data 86 may include GPS, speed, distance, battery, wind, temperature, payload, location to target, altitude, etc.

Data feeds to smart device 90 may for example be managed by the mission App 25 (FIG. 1) running on the smart device 22 and, e.g., include automatic identification system (AIS) 92 data, voice to text 94 using radio/cellular feeds 96, radar 98 from satellite feeds 99, and operational data inputs 97. Operational data inputs 97 may for example include mission status, mission time, survivor information, search area, incident action plan, plan for next shift, terrain analysis, port information, SAROPS (Search and Rescue Optimal Planning System), SARSAT (Search and Rescue Satellite-Aided Tracking), shipboard comms, etc.

Other direct communication feeds 77 may include UAS pilot 70 feeds, open sound control (OSC) feeds 72, and shared memory communication (SMC) feeds 74.

Accordingly, system 10 is configured to pull data from a variety of sources, e.g., sensors, communication devices, networks, UAV/UAS 76, etc., and to display information from those nodes, such as weather, temperature, GPS, wind speed, distance, temperature, payload, location to target, altitude, ceiling, humidity, and Wi-Fi signal strength. Further, specific information of interest, such as real-time weather impacts on a target or operation, can be geofenced and highlighted for further study and inspection. For example, data from the various feeds may be limited to a particular geographic region to ensure that the mission team does not stray from an objective.

Text data that can be displayed includes mission- and safety-critical input such as mission status, mission time, victim and survivor data, search area, incident action plan (IAP) data, terrain analysis, port information, operational and satellite data, locational and positional data from GPS and the Automated Identification System (AIS), as well as shipboard, helicopter and satellite communication data. This data can be integrated from peer-to-peer radio, high frequency spectrum systems, space-based, mobile, and terrestrial communication systems.

As noted, based on a mission criteria entered into a configuration App, users can control which data source types are to be made available, and whether the data source types can be mirrored across the displays (glasses) of the mission operations team. In illustrative embodiments, real-time videos and stills, along with LIDAR and thermal imaging, can be integrated into the display from UAV/UAS cameras and displayed on the right lens. Operators can toggle or swipe between the different types of graphics, imagery and/or video data. Conversely, text-based data such as operator movement data, operator and object speed, distance and location; ambient and forecast wind, weather, temperature and environmental conditions; UAS and other mission platform payloads, locations to target, and altitude, etc., can be displayed on the left lens as text. Audio messages converted to text can be displayed as text notifications on the left lens, or be shown above the video on the right lens. Splitting the data between text and graphics, imagery and/or video information provides rich multimodal data in separate human cognitive processing channels to support human brain-motor functions to improve operator effectiveness in mission-critical operations.

Figure 5:
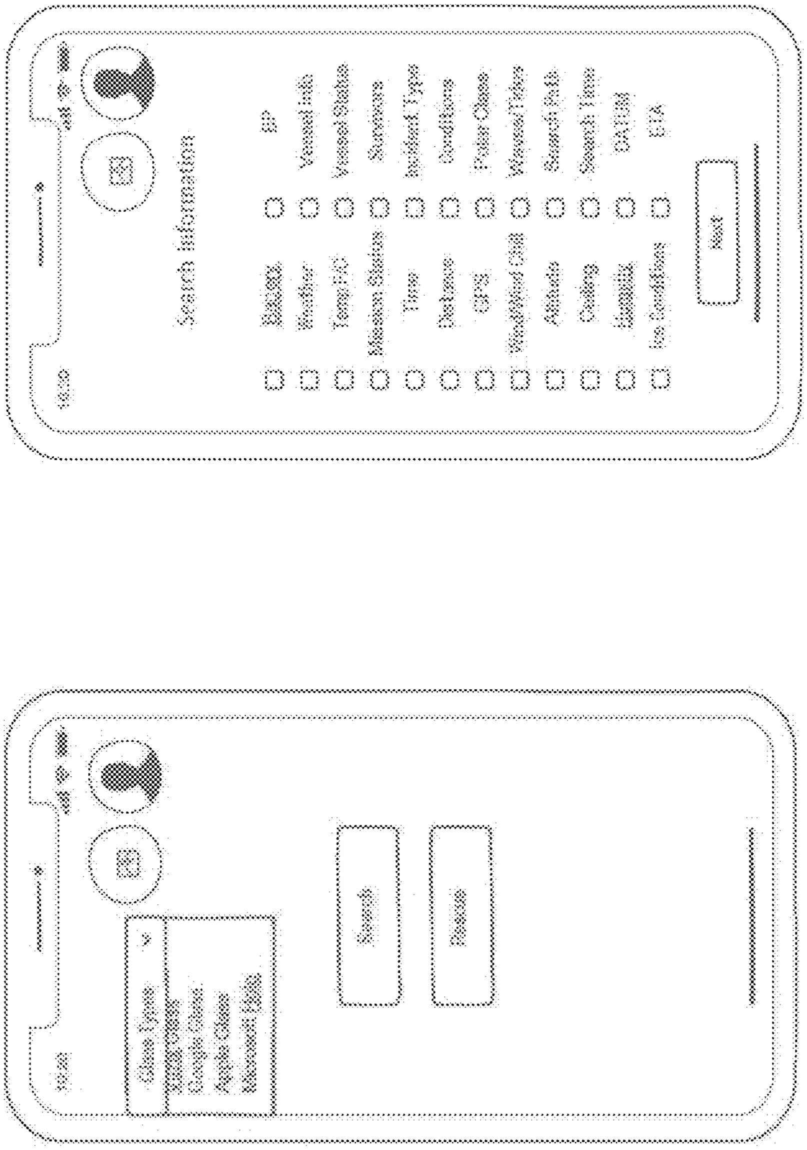
FIG. 5-7 depict interfaces for a configuration App, in accordance with an illustrative embodiment.
Figure 6:
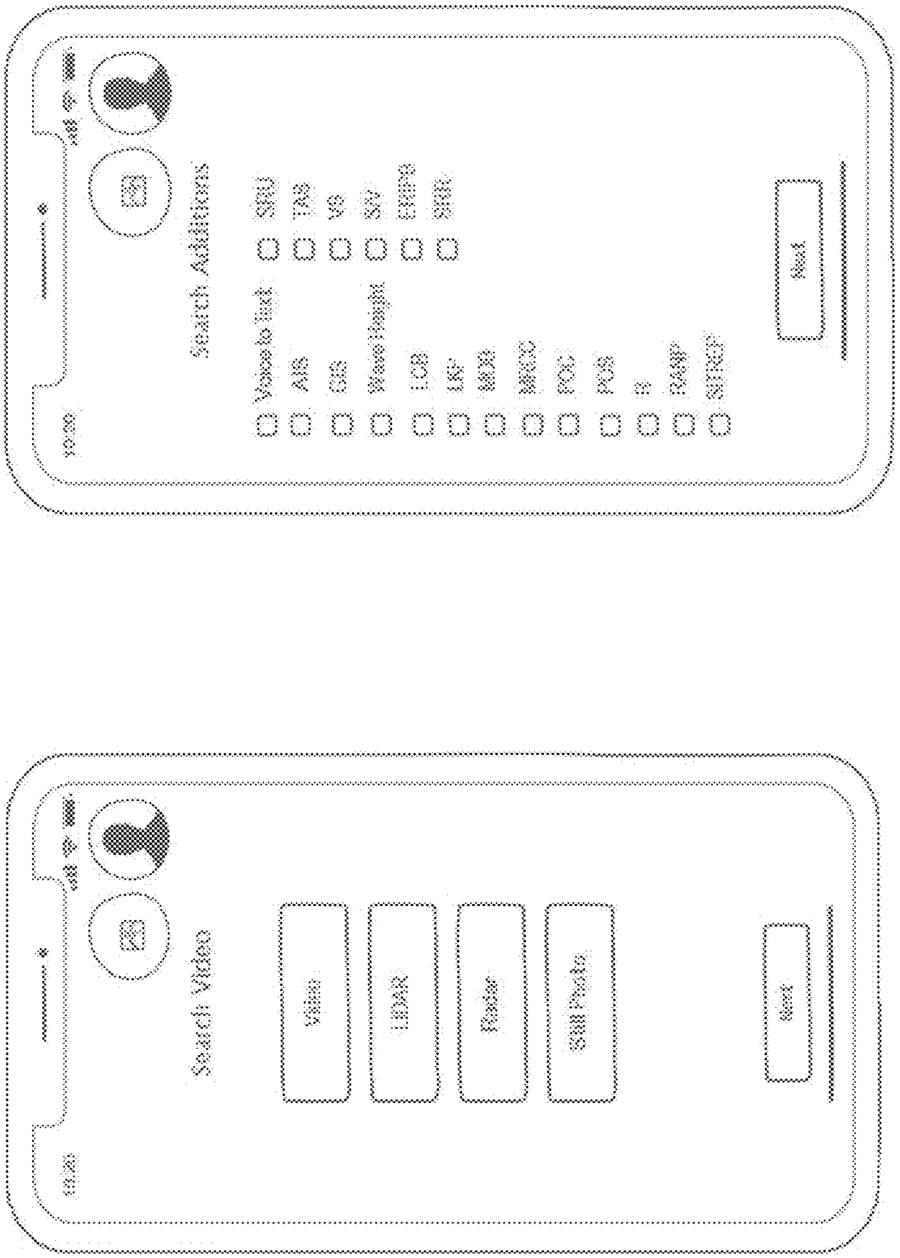
Figure 7:

FIG. 5-7 depict illustrative configuration App 24 (FIG. 1) interfaces for inputting a mission criteria and generating configuration parameters 20. Parameters 20 may for example be based on selectable types of devices, selectable types of safety critical missions, selectable types of text and image data required for the mission, and selectable data sources. For example, on the left image in FIG. 5, the user can select a wearable device type, (e.g., Google Glass, Microsoft Hololens, etc.) from a dropdown menu and select the type of mission, e.g., search, rescue, reconnaissance, information gathering, etc. On the right image, the user can select information they would like display for the mission, e.g., battery weather, GPS, mission status, waves/tides, etc.

As shown on the left image of FIG. 6, the user can select what types of image-based data, e.g., imagery, graphics or video is to be displayed on the right-hand lens, e.g., video, LiDAR, radar, still photos, etc. In the right image of FIG. 6, the user can check boxes for additional search and display features. As shown on the left image of FIG. 7, the user can select the search environment, e.g., ice, oil spill, sea, collision, etc. In the right image of FIG. 7, the user can select or control the communication channels and syncing options, e.g., synchronize with UAS, Glass, hotspots, satellite, Wi-Fi, AIS, etc.

With reference to FIG. 1, once selectable items are entered by the user in the App 24, configuration parameters 20 can be generated and be distributed to the user's wearable device and/or each of the team member's wearable devices. Additional features of the configuration App 24 may include, e.g., login screens, facilities for specifying team members, default configurations, facilities for altering selections, etc. In one illustrative embodiment, the configuration parameters 20 may be in the form of a file, such as:

```
<User> Mary Smith
  <Role> Team Leader
  <Device Type> Google Glass
<Team Members> John Smith, Sue Jones
<Configuration>
  <Image Lens> Right
    <Image View 1> UAV Video
    <Image View 2> LiDAR
    <Image View 3> Infrared
    <Other> Voice to Text Messages
  <Data Lens> Left
    <Data Page 1> weather forecast, mission status, mission time,
    survivor data
    <Data Page 2> GPS, visibility, terrain data
    <Icons> Battery, Wi-Fi Status, Temperature
<Data Feeds> Satellite, AIS, WiFi, iPhone
```

-continued

| |
|---|
| <Geofencing> e.g., longitude/latitude ranges |
| ... |

Once the configuration parameters 20 are loaded into the computing platform 14 of the wearable device 12, the communications manager 16 and display manager 18 can control the data feeds, as well as image-based and text-based data available for display onto the left and right lens 30, 32.

Figure 8:
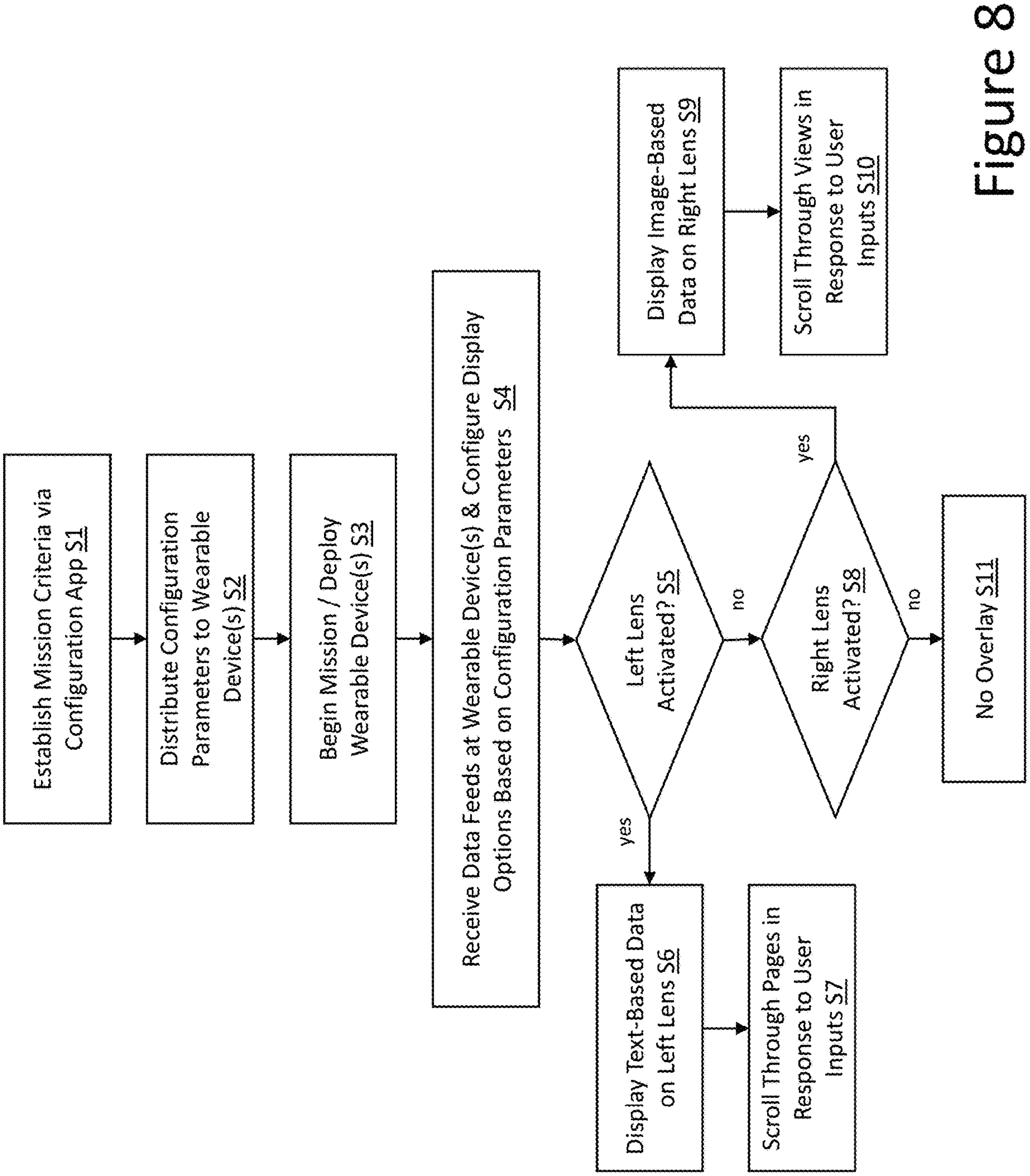
FIG. 8 depicts a flow diagram of a process for implementing an AR system, in accordance with an illustrative embodiment.

FIG. 8 depicts a block diagram of an illustrative method for implementing AR system 10. At S1, mission criteria is established via a configuration App 24, and at S2, configuration parameters 20 are distributed to one or more wearable devices 12. At S3, the mission begins, and wearable device (s) are deployed by the user and/or team members. At S4, data feeds are received by the wearable device(s), e.g., from an associated smart device, UAV/UAS systems, etc., and display options are configured based on the configuration parameters. If at S5 the left lens is activated, then text-based data is displayed on the left lens at S6, and pages of text-based data are scrolled through in response to user inputs at S7. If the left lens is not activated at S5, then at S8 a determination is made whether the right lens is activated. If no, then no overlay is presented on either lens at S11. If yes at S8, then image-based data is displayed on the right lens at S9, and views of image-based data are scrolled through in response to user inputs at S10. Activation of a lens (e.g., to switch or first activate one of the lenses) or deactivation of both lenses can thereafter occur anytime via user controls.

Note that in certain embodiments, pages of text-based or views of image-based data could be automatically scrolled periodically, e.g., every few seconds, without user action. Furthermore, while the described embodiments use the left eye lens for data and the right eye lens for images, it is understood that the opposite arrangement could likewise be implemented.

Figure 9:
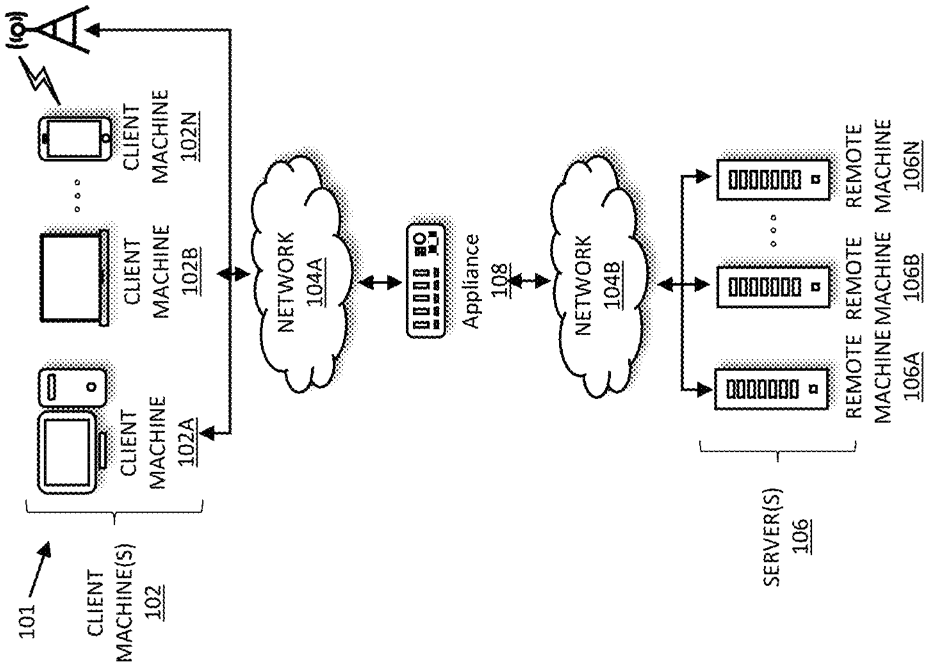
FIG. 9 depicts a network infrastructure, in accordance with an illustrative embodiment.

It is understood that the described AR system can be implemented using any computing technique, e.g., as a stand-alone system, a distributed system, a cloud, a network environment, etc. Referring to FIG. 9, a non-limiting network environment 101 in which various aspects of the disclosure may be implemented includes one or more client machines 102A-102N, one or more remote machines 106A-106N, one or more networks 104A, 104B, and one or more appliances 108 installed within the computing environment 101. The client machines 102A-102N communicate with the remote machines 106A-106N via the networks 104A, 104B.

In some embodiments, the client machines 102A-102N communicate with the remote machines 106A-106N via an intermediary appliance 108. The illustrated appliance 108 is positioned between the networks 104A, 104B and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104A and/or 104B.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client machine 102 may have the capacity to function as both a client node seeking access to resources provided by a server 106 and as a server 106 providing access to hosted resources for other client machines 102A-102N. The networks 104A, 104B may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client machine 102.

In yet other embodiments, a server 106 may execute a virtual machine providing, to a user of a client machine 102, access to a computing environment. The client machine 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network; and a primary private network 104. Additional embodiments may include a network of mobile telephone networks that use various protocols to communicate among mobile devices. For short range communications within a wireless local-area network (WLAN), the protocols may include 802.11, Bluetooth, and Near Field Communication (NFC).

Figure 10:
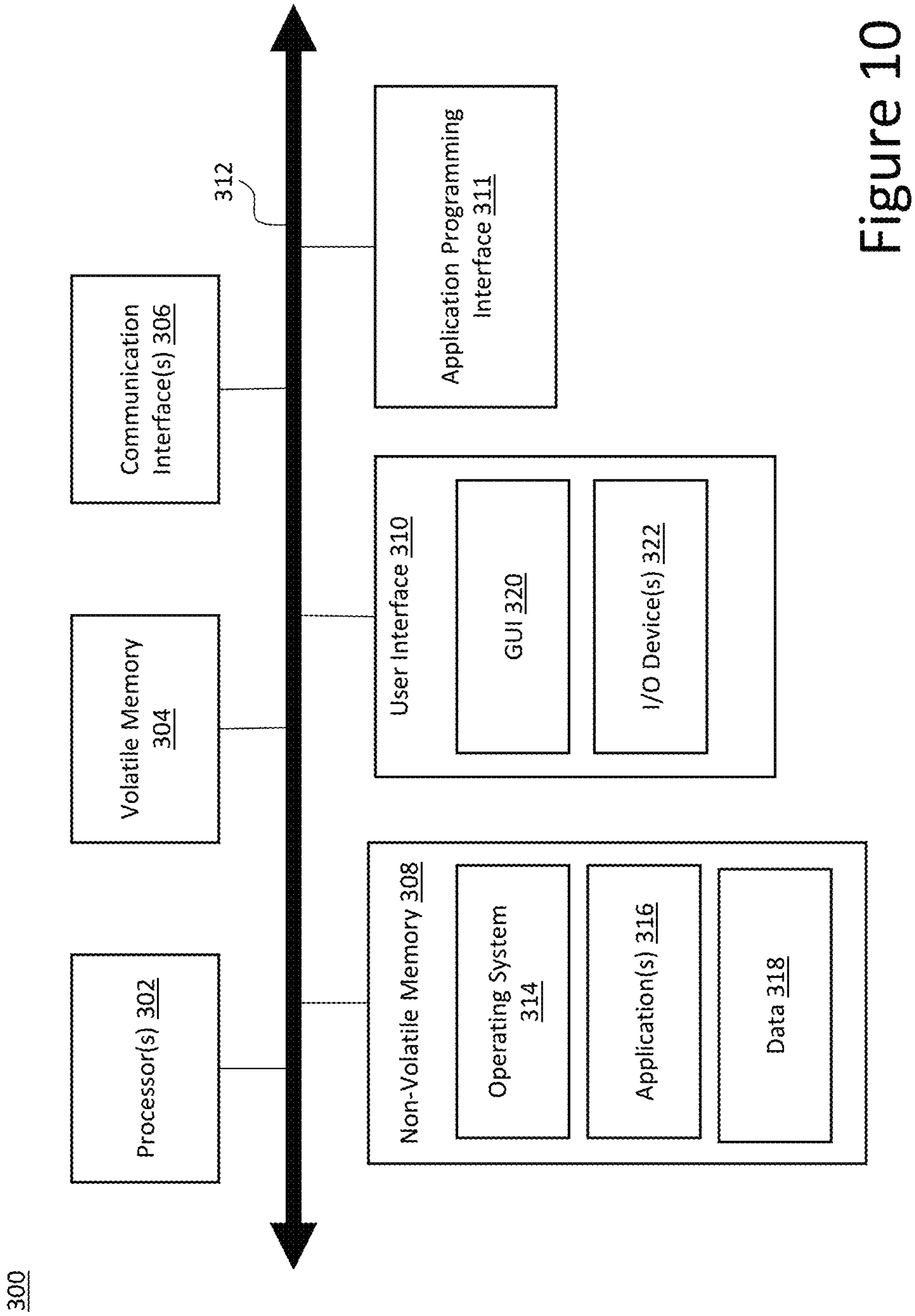
FIG. 10 depicts a computing system, in accordance with an illustrative embodiment.

Elements of the described solution may be embodied in a computing system, such as that shown in FIG. 10 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, an application programming interface (API) 311 (which may, e.g., include middleware) and communication bus 312.

User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 10 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

What is claimed is:

1. An augmented reality (AR) system that provides multimodal decision support for users engaged in safety critical missions, comprising:

a wearable device having a first lens configured for a first eye of a user and a second lens configured for a second eye of the user; and a computing platform integrated into the wearable device that includes:

a communication manager configured to receive and process communication feeds from a plurality of data sources; and a display manager configured to only activate either the first lens or the second lens at a time, wherein image-based overlay data is only displayable on the first lens and text-based overlay data is only displayable on the second lens, wherein the image-based overlay data includes a set of user-selectable views and the text-based overlay data includes a set of user-selectable pages, and wherein the image-based overlay data or text-based overlay data is displayable only when a respective first or second lens is activated.

2. The AR system of claim 1, wherein the computing platform further includes a set of configuration parameters that control the image-based overlay data and text-based overlay data available for display on the first and second lenses.

3. The AR system of claim 2, further comprising a configuration application having a user interface for determining the configuration parameters based on: a selectable type of safety critical mission, selectable types of text and image overlay data required for the mission, and selectable data sources.

4. The AR system of claim 3, wherein the configuration application is configured to run on a smart device and distribute the configuration parameters to a set of wearable devices for a set of users engaged in the mission.

5. The AR system of claim 1, wherein the image-based overlay data is selected from a group consisting of: video, weather radar, LiDAR, thermal imaging, night vision video, photos and graphics.

6. The AR system of claim 1, wherein the text-based overlay data is selected from a group consisting of: sensor data, communication data, weather data, location data, mission data, safety-critical data, terrain data, payload data, target data, automatic identification system (AIS) data, GPS data, and time data.

7. The AR system of claim 1, wherein the plurality of data sources includes an unmanned aerial vehicle/unmanned aerial system (UAV/UAS) and a mission App running on a smart device.

8. The AR system of claim 7, wherein the mission App collects satellite data and provides voice to text data.

9. The AR system of claim 7, wherein the UAV/UAS provides video data, LiDAR and thermal imaging data.

10. An augmented reality (AR) system that provides multimodal decision support for users engaged in safety critical missions, comprising:

a wearable device having a first lens configured for a first eye of a user and a second lens configured for a second eye of the user; and a computing platform integrated into the wearable device that includes: a communication manager configured to receive and process communication feeds from a plurality of data sources; and a display manager configured to only display image-based overlay data on the first lens and only text-based overlay data on the second lens, wherein the image-based overlay data includes a set of user-selectable views; and a mission App configured to run on a smart device that receives text-based overlay data from a plurality of sources and relays the text-based overlay data to the computing platform via the smart device;

wherein the image-based data includes a real-time video feed that flows directly from an unmanned aerial vehicle (UAV) to the wearable device; and wherein only one of the real-time video feed or the text-based overlay data can be displayed on a respective first or second lens at a time.

11. The AR system of claim 10, wherein the mission App running on the smart device is also configured to receive image-based overlay data from the unmanned aerial vehicle (UAV).

12. The AR system of claim 11, wherein the computing platform is configured to receive unmanned aerial system (UAS) data including: UAV location information, UAV speed, and weather.

13. The AR system of claim 10, wherein the text-based overlay data received from the mission App includes automatic identification system (AIS) data.

14. The AR system of claim 10, wherein the text-based overlay data received from the mission App includes voice to text data.

15. The AR system of claim 10, wherein the text-based overlay data received from the mission App includes at least one of mission status, mission time, survivor information, search area, incident action plan, terrain analysis, port information, SAROPS (Search and Rescue Optimal Planning System), SARSAT (Search and Rescue Satellite-Aided Tracking), and shipboard communications.

16. The AR system of claim 10, wherein the smart device and computing platform are synchronized via one of Wi-Fi or Bluetooth.

17. The AR system of claim 10, wherein the computing platform further includes a set of configuration parameters that control the image-based overlay data and text-based overlay data available for display on the first and second lenses.

18. The AR system of claim 17, further comprising a configuration application having a user interface for determining the configuration parameters based on: a selectable type of safety critical mission, selectable types of text and image overlay data required for the mission, and selectable data sources.

19. The AR system of claim 10, wherein only one of the left or right lens can be activated at a time.

20. A method for utilizing augmented reality (AR) to provide multimodal decision support for users engaged in safety critical missions, comprising:

receiving configuration parameters at a wearable device having a first lens configured for a first eye of a user and a second lens configured for a second eye of the user, wherein the configuration parameters are determined via a configuration App by a user establishing a mission criteria;

receiving data feeds at the wearable device from a plurality of data sources; and configuring display options of the data feeds based on the configuration parameters, wherein the display options include displaying only image-based overlay data on the first lens and only text-based overlay data on the second lens, wherein the image-based overlay data includes a set of user-selectable views and the text-based overlay data includes a set of user-selectable pages, and wherein only one of the image-based overlay data or text-based overlay data is displayable for the user at a time.

* * * * *